United States Patent [19]

Leland et al.

[11] Patent Number: 4,659,761

[45] Date of Patent: Apr. 21, 1987

[54] ZINC OXIDE IN POLY(ARYLENE SULFIDE) COMPOSITIONS

[75] Inventors: John E. Leland; James S. Dix; Robert S. Shue, all of Bartlesville, Okla.

[73] Assignee: Phillips Petroleum Company, Bartlesville, Okla.

[21] Appl. No.: 476,667

[22] Filed: Mar. 18, 1983

[51] Int. Cl.$^4$ ................................................ C08K 5/54
[52] U.S. Cl. ..................... 524/262; 524/432; 524/423; 524/451; 524/424; 524/435; 528/388
[58] Field of Search .............. 524/432, 262, 423, 451, 524/424, 435; 528/388

[56] References Cited

U.S. PATENT DOCUMENTS

| | | | |
|---|---|---|---|
| 3,451,873 | 6/1969 | Harrison et al. | 156/325 |
| 3,725,362 | 4/1973 | Walker | 528/373 |
| 3,856,735 | 12/1974 | Blackwell | 260/29.6 |
| 3,994,814 | 11/1976 | Cairns | 252/12.6 |
| 4,036,822 | 7/1977 | Patel | 260/79 |
| 4,178,276 | 12/1979 | Shue et al. | 260/37 |
| 4,251,575 | 2/1981 | Brady et al. | 528/388 |
| 4,395,512 | 7/1983 | Kubota et al. | 524/426 |
| 4,412,062 | 10/1983 | Reed | 264/331.11 |

FOREIGN PATENT DOCUMENTS

| | | |
|---|---|---|
| 0067676 | 12/1982 | European Pat. Off. . |
| 1056226 | 1/1967 | United Kingdom . |
| 2019770 | 11/1979 | United Kingdom . |

OTHER PUBLICATIONS

Chem. Abstracts 87, 185726d (1977).
Japanese Patents Gazette, p. 2, Mar. 16, 1983.

Primary Examiner—Melvyn I. Marquis
Attorney, Agent, or Firm—S. E. Reiter

[57] ABSTRACT

Zinc oxide is used in poly(arylene sulfide compositions to improve encapsulation properties and to inhibit color shift. The invention includes electronic components encapsulated with poly(arylene sulfide) compositions containing zinc oxide.

31 Claims, No Drawings

ZINC OXIDE IN POLY(ARYLENE SULFIDE) COMPOSITIONS

This invention relates to poly(arylene sulfide) compositions. In one aspect this invention relates to electronic components encapsulated with poly(arylene sulfide) compositions. In another aspect this invention relates to poly(arylene sulfide) compositions containing a color shift inhibitor.

BACKGROUND AND OBJECTS

The encapsulation of electronic components represents an art in and of itself. Electronic components are encapsulated to maintain electrical insulation, to provide mechanical protection and to otherwise shield the component from exposure to its environment. As the evolution of electronics continues its rapid advance it becomes increasingly important that the art and technology of encapsulation keep pace. An area of significant concern and interest relates specifically to the compositions used to encapsulate electronic components. There is an on-going effort to discover new and improved encapsulation materials. A relatively recent development has been the use of poly(arylene sulfide) compositions such as, for example, poly(phenylene sulfide) compositions, as encapsulating materials.

The reliability and useful life of an electronic component depends upon various factors. One important factor is the material used to encapsulate the electronic component. It is desired to employ encapsulation compositions which maximize the reliability and useful life of electronic components.

It is one object of this invention to improve the reliability and increase the life of electronic components encapsulated with poly(arylene sulfide) compositions. It is another object of this invention to provide improved encapsulation compositions and electronic components encapsulated therewith.

Pigmented poly(arylene sulfide) compositions are frequently processed (e.g. molded, extruded, etc.) at elevated temperatures. The presence of certain components in the composition may make the color of the composition temperature sensitive. For example, if identical compositions are processed at different temperatures the resultant materials may have different colors, i.e. a color shift may occur at the higher temperature.

It is a further object of this invention to provide poly(arylene sulfide) compositions susceptible to color shift with a color shift inhibitor. Poly(arylene sulfide) compositions so inhibited are useful as laser printable materials and encapsulation materials and for any other application where a pigmented poly(arylene sulfide) is desired.

Other objects, advantages and aspects of this invention will become apparent to persons skilled in the art upon study of this disclosure and the appended claims.

BRIEF SUMMARY OF THE INVENTION

It has been discovered that the addition of zinc oxide to poly(arylene sulfide) compositions can improve the reliability and lengthen the life of electronic components encapsulated therewith. It has also been discovered that zinc oxide can inhibit the color shift associated with poly(arylene sulfide) compositions containing certain pigments and silanes. This invention is further, and more completely, described in the disclosure that follows.

DESCRIPTION OF THE INVENTION

In accordance with this invention an electronic component is encapsulated with a composition containing poly(arylene sulfide) and zinc oxide. This invention includes electronic components encapsulated with the above-described composition as well as certain encapsulation compositions that are especially well suited for the encapsulation of electronic components.

In accordance with another aspect of this invention a composition containing poly(arylene sulfide), pigment and silane is inhibited against color shift by the addition thereto of zinc oxide.

This invention includes the article of manufacture and the compositions described and set forth as follows.

1. Article of Manufacture

The article of manufacture of this invention is an electronic component encapsulated with a composition containing poly(arylene sulfide) and zinc oxide.

For the purposes of this entire disclosure and the appended claims the term poly(arylene sulfide) is intended to designate arylene sulfide polymers. Uncured or partially cured poly(arylene sulfide) polymers whether homopolymer, copolymer, terpolymer, and the like, or a blend of such polymers, can be used in the practice of my invention. The uncured or partially cured polymer is a polymer the molecular weight of which can be increased by either lengthening of a molecular chain or by cross-linking or by combination of both by supplying thereto sufficient energy, such as heat. Suitable poly(arylene sulfide)polymers include, but are not limited to, those described in U.S. Pat. No. 3,354,129, incorporated by reference herein.

Some examples of poly(arylene sulfide) suitable for the purposes of our invention include poly(2,4-tolylene sulfide), poly(4,4'-biphenylene sulfide) and poly(phenylene sulfide). Because of its availability and desirable properties (such as high chemical resistance, nonflammability, and high strength and hardness) poly(phenylene sulfide) is the presently preferred poy(arylene sulfide). Accordingly, poly(phenylene sulfide) compositions are the preferred encapsulation compositions of our invention.

In accordance with this invention electronic components are encapsulated with a poly(arylene sulfide) composition (such as, for example, a poly(phenylene sulfide) composition) containing zinc oxide. The poly(arylene sulfide) composition can be, but is not required to be, a mixture of more than one type of poly(arylene sulfide). The poly(arylene sulfide) composition can contain, in addition to zinc oxide, other components although the broad concept of our invention is not limited thereto.

Our invention also includes electronic components encapsulated with more detailed poly(arylene sulfide) compositions which are especially well suited for successful use as encapsulation compositions. These compositions are described later in this disclosure.

Zinc oxide is a material well known by, and readily available to, persons skilled in the art. This invention is not limited to any particular type or grade of zinc oxide. For a more detailed discussion of zinc oxide any one of numerous references can be consulted. One such reference is the Kirk-Othmer Encyclopedia of Technology, Second Edition, Volume 22, pages 609+.

Broadly this invention is not limited to any ranges of materials. It is contemplated, however, that the ratio of (a) the weight of poly(arylene sulfide) in the composition to (b) the weight of zinc oxide in the composition will generally be at least about 2.5 to 1 and less than about 2,500 to 1. This ratio, called the weight ratio, is calculated with disregard to the presence or absence of other components in the composition. We prefer a weight ratio (i.e. (a) to (b) of at least about 10 to 1 and less than about 100 to 1. Good results within this range have been obtained. It should be noted that the choice of a particular weight ratio will be greatly influenced by the presence and relative amounts of other components in the composition.

The electronic components to be encapsulated in accordance with our invention broadly include all electronic components (i.e. devices, parts, etc.) for which encapsulation is desired. The term electronic component is intended to be broadly construed and includes, by way of non-limiting example, the following:

capacitors,
resistors,
resistor networks,
integrated circuits,
transistors,
diodes,
triodes,
thyristors,
coils,
varistors,
connectors,
condensers,
transducers,
crystal oscillators,
fuses,
rectifiers,
power supplies, and
microswitches, The definition of each of the above-identified electronic components is similarly intended to be broad and comprehensive. The term integrated circuit, for example, is intended to include, but is not limited to large scale integrated circuits,
TTL (transistor transistor logic),
hybrid integrated circuits,
linear amplifiers,
operational amplifiers,
instrumentation amplifiers,
isolation amplifiers,
multipliers and dividers,
log/antilog amplifiers,
RMS-to-DC converters,
voltage references,
transducers,
conditioners,
instrumentation,
digital-to-analog converters,
analog-to-digital converters,
voltage/frequency converters,
synchro-digital converters,
sample/track-hold amplifiers,
CMOS switches and multiplexers,
data-acquisition subsystems,
power supplies,
memory integrated circuits,
microprocessors,
and so on.

The scope of this invention broadly allows the inclusion of fillers and reinforcements in the encapsulation composition. Fillers can be used to improve the dimensional stability, thermal conductivity and mechanical strength of the composition. Some suitable fillers include, for example, talc, silica, clay, alumina, calcium sulfate, calcium carbonate, mica and so on. The fillers can be in the form of, for example, powder, grain or fiber. In selecting a filler the following factors should be considered:

(1) the electrical conductivity of the filler (the lower the better.
(2) the thermal stability of the filler at encapsulation temperatures; and
(3) the level of ionic impurities in the filler.

Suitable reinforcements include fibers of glass or calcium silicate (e.g. wollastonite). Examples of other reinforcements include glass or calcium silicate in nonfibrous form (e.g. beads, powders, grains, etc.) and fibers of other materials such as asbestos, ceramics, etc.

Although this invention is not limited thereto, a hydrogenated conjugated diene/monovinyl-substituted aromatic copolymer can be included in the poly(arylene sulfide) composition. An example of such a copolymer is hydrogenated butadiene/styrene copolymer. Others are known to persons skilled in the art.

The electrical resistance and hydrolytic stability of the encapsulation compositions of this invention can be improved by the addition of an organosilane. Many suitable organosilanes are known in the art. Good results can be obtained with, for example, N-{2-[3-(trimethoxysilyl)propylamino]ethyl}-p-vinylbenzylammonium chloride. Organomercaptosilanes can also be used for this purpose. 3-Mercaptopropyltrimethoxysilane, $HSCH_2CH_2CH_2Si(OCH_3)_3$, is most preferred because of its high utility in improving electrical resistance and hydrolytic stability.

Besides reinforcements, fillers, copolymers and silanes the compositions can optionally contain relatively small amounts of other ingredients such as, but not limited to, pigments, flow improvers, and processing aids.

2. Special Encapsulation Compositions

It should be noted that the first list of electronic components includes both active components (such as, for example, integrated circuits, transistors and diodes) and passive components (such as, for example, capacitors, resistors and resistor networks). The distinction is frequently important and is often determinative of the type of poly(arylene sulfide) encapsulation composition best suited for encapsulation of the component.

These more detailed poly(arylene sulfide) compositions, which are especially well suited for successful use as encapsulation compositions, broadly comprise the following:

(a) poly(arylene sulfide),
(b) zinc oxide,
(c) reinforcement, and
(d) filler.

These compositions can optionally contain, in addition to (a), (b), (c) and (d) above, relatively small amounts of other components such as, for example, hydrogenated conjugated diene/monovinyl-substituted aromatic copolymers, organosilanes, pigments, flow improvers and processing aids. These compositions are described in more detail in A and B below.

A. COMPOSITIONS FOR THE ENCAPSULATION OF ACTIVE COMPONENTS

Compositions used for the encapsulation of active components can be prepared in accordance with the following weight percentages:
- (a) Poly(arylene sulfide)
  - about 25 to about 45 wt % broad range
  - about 32 to about 38 wt % preferred range
- (b) Zinc oxide
  - about 0.1 to about 10 wt % broad range
  - about 0.5 to about 5 wt % preferred range
- (c) Reinforcement
  - about 5 to about 30 wt % broad range
  - about 10 to about 20 wt % preferred range
- (d) Filler
  - about 40 to about 60 wt % broad range
  - about 45 to about 55 wt % preferred range The above weight percentages are based upon the total amount of (a), (b), (c) and (d) in the composition. Other components, including those previously identified, can optionally be present.

The broad ranges represent the ranges within which the composition should be confined in order to obtain good results. The preferred ranges are preferred because they define a composition possessing the physical, chemical and electrical properties best suited for its intended encapsulation purposes.

Although our invention is not limited thereto the viscosity of the composition used for encapsulation of active components should generally not exceed about 800 poise (as tested on a capillary rheometer at 650° F. and at a shear rate of 1000 $(sec)^{-1}$). Encapsulation of active electronic components with compositions having viscosities in excess of about 800 poise can cause damage to the components. It is contemplated that the viscosity of the composition will generally range from about 150 to about 500 poise for active components other than very delicate components such as, for example, integrated circuits with wire leads. With respect to very delicate components such as, for example integrated circuits with wire leads, the viscosity of the encapsulation composition should be below about 150 poise (as tested on a capillary rheometer at 650° F. and at a shear rate of 1000 $(sec)^{-1}$). Encapsulation of integrated circuits with compositions any higher in viscosity can cause wire wash (i.e., breaking of the wires of the integrated circuit). It is contemplated that the viscosity of the composition for the encapsulation of such integrated circuits and the like will generally range from about 75 to about 150 poise.

Although viscosity of the composition depends on a number of factors, to obtain composition viscosities below about 800 poise the viscosity of the poly(arylene sulfide) should generally not exceed about 130 poise (as tested on a capillary rheometer at 650° F. and at a shear rate of 1000 $(sec)^{-1}$). It is contemplated that the viscosity of the poly(arylene sulfide) will, in most applications, range up to about 70 poise. To obtain composition viscosities within the desired range for delicate active components such as, for example, integrated circuits with wire leads, the viscosity of the poly(arylene sulfide) should generally be less than about 25 poise (as tested on a capillary rheometer at 650° F. and at a shear rate of 1000 $(sec)^{-1}$).

The reinforcements can be, for example, glass fibers or calcium silicate fibers.

The filler can be, for example, silica. The silica can be amorphous silica or crystalline silica. Silica is commercially available as a finely ground material having a relatively narrow particle size distribution ranging from about 1 to about 100 micrometers. Such commercial silica is typically made up of about 99.5 weight percent $SiO_2$ with $Al_2O_3$, $Fe_2O_3$, $Na_2O$ and $K_2O$ as the remaining components.

Other fillers include, for example, talc, glass, clay, mica, calcium sulfate and calcium carbonate.

The preferred encapsulation composition for active components is prepared from:
- (a) about 32 to about 38 wt % poly(phenylene sulfide) (viscosity less than about 130 poise as tested on a capillary rheometer at 650° F. and at a shear rate of about 1000 $(sec)^{-1}$),
- (b) about 0.5 to about 5 wt % zinc oxide,
- (c) about 10 to about 20 wt % glass fibers or calcium silicate fibers, and
- (d) about 45 to about 55 wt % silica.

The above weight percentages are based upon the total amount of (a), (b), (c) and (d) in the composition. Other components, including those previously identified, can optionally be present.

If the viscosity of the poly(phenylene sulfide) is below about 25 poise (as tested on a capillary rheometer at 650° F. and at a shear rate of 1000 $(sec)^{-1}$) this composition is especially well suited for the encapsulation of integrated circuits with wire leads. Accordingly, integrated circuits encapsulated with this composition, represent one embodiment of my invention.

B. COMPOSITION FOR THE ENCAPSULATION OF PASSIVE COMPONENTS

Compositions used for the encapsulation of passive components can be prepared in accordance with the following weight percentages:
- (a) Poly(arylene sulfide)
  - about 25 to about 45 wt % broad range
  - about 32 to about 38 wt % preferred range
- (b) Zinc oxide
  - about 0.1 to about 10 wt % broad range
  - about 0.5 to about 5 wt % preferred range
- (c) Reinforcement
  - about 20 to about 50 wt % broad range
  - about 25 to about 45 wt % preferred range
- (d) Filler
  - about 18 to about 38 wt % broad range
  - about 23 to about 33 wt % preferred range The above weight percentages are based upon the total amount of (a), (b), (c) and (d) in the composition. Other components, including those previously identified, can optimally be present.

The broad ranges represent the ranges within which the composition should be confined in order to obtain good results. The preferred ranges are preferred because they define a composition possessing the physical, chemical and electrical properties best suited for its intended encapsulation purposes.

Although our invention is not limited thereto the viscosity of the composition used for encapsulation of passive components should generally not exceed about 1200 poise (as tested on a capillary rheometer at 650° F. and at a shear rate of 1000 $(sec)^{-1}$). Encapsulation of passive electronic components with compositions having viscosities in excess of about 1200 poise can cause damage to the components. It is contemplated that the viscosity of the composition will generally range from about 500 to about 800 poise.

To obtain composition viscosities within the desired ranges the viscosity of the poly(arylene sulfide) should generally not exceed about 300 poise (as tested on a capillary rheometer at 650° F. and at a shear rate of 1000 $(sec)^{-1}$). It is contemplated that the viscosity of the poly(arylene sulfide) will generally range from about 190 to about 300 poise.

The reinforcements can be, for example, glass fibers or calcium silicate fibers.

The preferred filler is talc because of its availability and ability to improve the dimensional stability, thermal conductivity and mechanical strength of the composition. In place of talc, or in combination with talc, other fillers can be used. Examples of such suitable fillers include, silica, calcium sulfate, calcium carbonate, clay, glass and mica. Calcium sulfate is especially useful in compositions used to encapsulate connectors.

The preferred encapsulation composition for passive components is prepared from:

(a) about 32 to about 38 wt % poly(phenylene sulfide) (viscosity less than about 300 poise as tested on a capillary rheometer at 650° F. and at a shear rate of about 1000 $(sec)^{-1}$), (b) about 0.5 to about 5 wt % zinc oxide, (c) about 25 to about 45 wt % glass fibers or calcium silicate fibers, and (d) about 23 to about 33 wt % talc.

The above weight percentages are based upon the total amount of (a), (b), (c) and (d) in the composition. Other components, including those previously identified, can optionally be present.

This composition is especially well suited for, but not limited to, the encapsulation of capacitors. Accordingly, capacitors, encapsulated with this composition, represent an embodiment of our invention.

3. Composition Inhibited Against Color Shift

It has been discovered that zinc oxide can be used to inhibit the color shift associated with the high temperature processing of a poly(arylene sulfide) composition containing a pigment and a silane. In the absence of the silane a color shift does not occur over a normal range of processing temperatures. The presence of the silane, however, can cause a temperature-sensitive shift of color to occur. To avoid this color shift, processing temperatures must be held lower than otherwise desired. Zinc oxide inhibits the color shift and allows higher temperature processing of the composition.

The pigment, in this aspect of the invention, is any pigment selected from monoazo nickel complex pigments (see, for example U.S. Pat. No. 2,396,327, incorporated by reference herein), iron oxide pigments, lead chromate pigments, cadmium sulfo-sulfide pigments, and combinations of any two or more thereof (e.g. a combination of an iron oxide pigment and a lead chromate pigment; a combination of an iron oxide pigment and a cadmium sulfo-sulfide pigment; etc.).

The silane in this aspect of the invention is any silane selected from the organomercaptosilanes, the organoaminosilanes and any combination thereof. An organomercaptosilane is an organosilane characterized by a mercapto (—SH) functionality in its chemical formula. An example is 3-mercaptopropyltrimethoxysilane. An organoaminosilane is an organosilane characterized by an amino functionality in its chemical formula. Examples include 3-aminopropyltrimethoxysilane and N-{2-[3-(trimethoxysilyl)propylamino]ethyl}-p-vinylbenzylammonium chloride.

Poly(arylene sulfide) compositions containing the above-identified silanes and pigments are laser printable and are useful for the encapsulation of electronic components. This aspect of the invention, although not limited thereto, has applicability to the compositions described in 1 and 2 above wherein those compositions further contain a pigment and a silane as identified above. This aspect of the invention is not limited to encapsulation compositions but includes any application where it is desired to inhibit color shift.

Although this invention is not limited thereto it is contemplated that the invention will usually be practiced within the ranges provided below.

| Component | Weight Ratio of Poly(arylene sulfide) to Component | |
|---|---|---|
| zinc oxide: | at least about 2.5 to 1 less than about 2,500 to 1 | (broad range) |
|  | at least 10 to 1 less than about 100 to 1 | (narrow range) |
| pigment: | at least about 2.5 to 1 less than about 2,500 to 1 | (broad range) |
|  | at least about 10 to 1 less than about 100 to 1 | (narrow range) |
| silane: | at least about 2.5 to 1 less than about 2,500 to 1 | (broad range) |
|  | at least about 10 to 1 less than about 100 to 1 | (narrow range) |

The above weight ratios are calculated with disregard to the presence or absence of other components in the composition. The narrow ranges are preferred because good results have been obtained within those ranges.

The use of zinc oxide as a color shift inhibitor is desirable when the poly(arylene sulfide) composition is subjected to a temperature at which a color shift would occur in the absence of the zinc oxide. This color shift inhibiting aspect of the invention is further illustrated in Example II.

4. How to Make

The compositions of this invention can be made in accordance with any method wherein the poly(arylene sulfide), zinc oxide and other components (if any) are combined to form a mixture. Many suitable methods are well known to those of skill in the art. By way of example, the components of the composition can be mixed together at room temperature in a rotating drum blender or in an intensive mixer such as a Henschel mixer and then extrusion compounded at a temperature above about the melting point of the poly(arylene sulfide) to produce a uniform blend.

Once made, the composition can be used to encapsulate electronic components in accordance with any encapsulation method suitable for thermoplastic encapsulation compositions. Such methods are well known in the art. The composition can be heated to a temperature of at least about the melting point of the poly(arylene sulfide) and then used to encapsulate electronic components. The composition can, for example, be introduced into an injection molding apparatus to produce a melt which is extruded into an injection mold wherein the electronic component to be encapsulated is positioned. Transfer molding processes are also acceptable.

The following examples are presented to facilitate disclosure of this invention and should not be interpreted to unduly limit its scope.

EXAMPLE I

This example demonstrates the utility of zinc oxide in poly(arylene sulfide) encapsulation compositions. Two compositions, A and B, were prepared in accordance with Table 1 below.

TABLE 1

| (Compositions - weight percentages[g]) | | |
|---|---|---|
| | A | B |
| poly(phenylene sulfide)[a] | 34.0% | 33.64% |
| wollastonite[b] | 14.4% | 14.46% |
| silica[c] | 49.4% | 48.9% |
| 3-mercaptopropyltrimethoxysilane[d] | 1.0% | 1.0% |
| hydrogenated random copolymer[e] | 1.0% | 1.0% |
| zinc oxide[f] | | 1.0% |
| | 100.0% | 100.0% |

[a]PPS, from Phillips Chemical Company, having a viscosity of about 17 poise as tested on a capillary rheometer at 650° F. and at a shear rate of 1000 (sec)$^{-1}$.
[b]Calcium silicate fibers sold under the trademark Wollastokup G187 0.5 NYCO, a division of Processed Minerals, Inc., Willsboro, N.Y.
[c]Fused silica (GP 7I) from Harbison-Walker Refractories, a division of Dresser Industries, Inc.
[d]A-189 TM from Union Carbide Corp.
[e]Hydrogenated 41 wt. % butadiene/59 wt. % styrene linear random copolymer having a weight molecular weight of about 125,000. (See U.S. Pat. No. 3,554,911).
[f]French Process zinc oxide manufactured by Pacific Smelting Co.
[g]The percentages given in Table 1 are weight percentages and are based upon the total weight of the composition.

Each of the compositions was prepared as follows. The silica and silane were premixed. The silica/silane and the other components were added to a Henschel mixer and mixed until completely dispersed. The resultant mixture was passed through a Buss-Condux cokneader extruder at 570°–600° F. and pelletized.

Each composition was used to encapsulate integrated circuits (I.C.'s) in the manner described below. The pelletized material of composition A was injection molded using a 75 ton Newberry molding machine (650° F. stock temperature, 275° F. mold temperature at 300# injection pressure and 10% rate setting) onto 10 copper alloy integrated circuit lead frames. Each of the lead frames had 10 integrated circuit components. Thus, composition A was used to encapsulate 100 integrated circuits. Each of the encapsulated lead frames was cut and trimmed into the individual integrated circuits. Each integrated circuit was a LM 101 linear operational amplifier. After encapsulation, the encapsulated portion of each integrated circuit measured about 0.5 inch×0.25 inch×0.125 inch. The above encapsulation procedure was repeated for composition B.

Prior to encapsulation each integrated circuit was visually inspected for faults. Faulty integrated circuits were marked. Following encapsulation, cutting and trimming the marked (i.e. faulty) integrated circuits were discarded. Remaining for testing were 74 integrated circuits encapsulated with composition A and 77 integrated circuits encapsulated with composition B. These remaining circuits were subjected to a "Device Electric Yield" test.

The "Device Electric Yield" test is a test to determine the percentage of integrated circuits that were successfully encapsulated. This test was conducted as follows. The encapsulated integrated circuits were placed on a Teflon board consisting of individual zero force insertion sockets. The sockets were connected to an Idea Box (manufactured by Global Specialties) which was equipped with a 5-volt power source and a signal generator. The Idea Box was also connected to a monitor (Oscilloscope, Model 222A, Hewlett Packard). Failure or passage of each encapsulated integrated circuit was determined by the pattern on the oscilloscope. The pattern corresponding to each successfully encapsulated integrated circuit conformed with a standard pattern. Failure (i.e. unsuccessful encapsulation) was indicated by nonconformance with the standard pattern. Of the 74 integrated circuits encapsulated with composition A 66 passed the test. Of the 77 integrated circuits encapsulated with composition B 68 passed the test.

Of the 66 successfully encapsulated integrated circuits of composition A, 10 were tested in accordance with the "Constant Test", also known as the "Pressure Pot Test with Bias". The 10 integrated circuits were placed on a 8 inch × 10 inch Teflon board equipped with sockets to receive the leads of the integrated circuits. The board also had electric leads to each circuit. The assembled board was placed in an autoclave at 115° C. and about 10 psig. The atmosphere in the autoclave was saturated with water vapor. A 30-volt potential was constantly applied across the power leads of the integrated circuits. The integrated circuits were periodically removed from the autoclave for testing to determine if each integrated circuit was still functioning correctly. As the test progressed the number of failures after each time period was recorded. This same test was also conducted using 10 of the 68 successfully encapsulated integrated circuits of composition B. The results are given in Table 2 under the heading "without solder dipping".

Most of the other integrated circuits not tested above were solder dipped, i.e. the leads of each integrated circuit were covered with solder. Of these soler dipped integrated circuits, 20 encapsulated with composition A and 20 encapsulated with composition B were tested in accordance with the "Constant Test" described above. The results are given in Table 3 under the heading "solder dipped".

TABLE 2

| (without solder dipping) | | |
|---|---|---|
| | Failures | Hours in Autoclave |
| Composition A | 1 | 48 |
| | 2–5 | 213 |
| | 6–8 | 282 |
| | 9 | 446 |
| | 10 | 1,624 |
| Composition B | 1 | 2,118 |
| | 2 | 2,446 |
| | 3 | 2,590 |
| | 4 | 2,681 |

TABLE 3

| (solder dipped) | | |
|---|---|---|
| | Failures | Hours in Autoclave |
| Composition A | 1–2 | 231 |
| | 3–13 | 393 |
| | 14–15 | 487 |
| | 16 | 557 |
| | 17–18 | 651 |
| | 19 | 721 |
| | 20 | 815 |
| Composition B | 1–2 | 393 |
| | 3–4 | 720 |
| | — | 1,301 |

Table 2 shows that the 10th and last failure of the integrated circuit encapsulated with composition A occurred when checked at 1,624 hours. The other nine integrated circuits encapsulated with composition A failed when tested at 446 hours or earlier. With respect to the integrated circuits encapsulated with composition B it is seen that the 4th failure occurred at 2,681 hours. After 2,681 hours 6 of the integrated circuits encapsulated with composition B were still functioning correctly.

Table 3 shows that the 20th and last failure of the solder dipped integrated circuits encapsulated with composition A occurred at 815 hours. The other 19 integrated circuits encapsulatd with composition A failed at 721 hours or earlier. With respect to the solder dipped integrated circuits encapsulated with composition B it is seen that the 3rd and 4th failures occurred at 720 hours. The other 16 integrated circuits were still functioning correctly when checked after 1,301 hours.

The results presented in Table 2 and Table 3 demonstrate the utility of zinc oxide in improving reliability and prolonging the life of encapsulated electronic components. Composition B (zinc oxide) drastically outperformed composition A (without zinc oxide).

EXAMPLE II

This example shows the color shift problem associated with organomercaptosilane-containing poly(arylene sulfide) compositions and demonstrates the color shift inhibiting utility of zinc oxide. Three compositions, C, D and E, were prepared in accordance with Table 4 below.

TABLE 4

| (compositions-weight percentages[i]) | | | |
|---|---|---|---|
| | C | D | E |
| poly(phenylene sulfide)[a] | 35% | 35% | 35% |
| fiberglass[b] | 35% | 35% | 35% |
| talc[c] | 12.75% | 11.75% | 9.75% |
| titanium dioxide[d] | 15% | 15% | 15% |
| 3-mercaptopropyltrimethoxysilane[e] | | 1% | 1% |
| pigment[f] | 2% | 2% | 2% |
| processing aid[g] | .25% | .25% | .25% |
| zinc oxide[h] | | | 2% |
| | 100% | 100% | 100% |

[a]PPS, from Phillips Chemical Company, having a viscosity of about 210 poise as tested on a capillary rheometer at 650° F. and at a shear rate of 1000 (Sec)$^{-1}$.
[b]Fiberglass Grade 197 from Owens-Corning, Amarillo, Texas.
[c]Talc type 2620 from Pioneer Talc Co., Van Horn, Texas.
[d]Titanium dioxide, Unitane 0-110 TM from American Cyanamid Co.
[e]A-189 TM from Union Carbide Corp.
[f]Yellow pigment, Harmon Y-5694 TM from Harmon Chemical Co., Hawthorne, New Jersey.
[g]Polyethylene, Marlex ® EMN-TR885 from Phillips Chemical Company.
[h]Zinc oxide, U.S.P. grade, from Mallinkrodt, Inc.
[i]The percentages given in Table 4 are weight percentages and are based upon the total weight of the composition.

Each composition was separately prepared as follows. The composition components were mixed together in a Henschel mixer until the components were completely dispersed. The resultant mixture was passed through a Buss-Condux cokneader extruder at 570°–600° F. and pelletized.

Each composition thus produced was used to make discs (2⅛ inch diameter, 1/16 inch thick) in the following manner. The pelletized material was injection molded, using an Arburg molding machine, into the discs. From composition C a first disc was molded at 575° F. and a second disc was molded at 650° F. From composition D a first disc was molded at 600° F. and a second disc was molded at 650° F. From composition E a first disc was molded at 600° F. and a second disc was molded at 650° F.

Each disc was carefully observed for color. The observed color corresponding to each disc is reported in Table 5 below.

TABLE 5

| | (Observed Disc Color) | | |
|---|---|---|---|
| Composition | 575° F. | 600° F. | 650° F. |
| C | yellow gold | — | yellow gold |
| D | — | yellow gold | green gold |
| E | — | yellow gold | yellow gold |

Composition C was color stable over the temperatures tested. There was no significant difference in color between the first (575° F.) and second (650° F.) discs. Composition D, containing the silane, exhibited a color shift. The first disc (600° F.) was yellow gold, however, the second disc (650° F.) was green gold. Composition E, containing both the silane and zinc oxide, was color stable, i.e. there was no significant difference in color between the first (600° F.) and second (650° F.) discs. The results associated with composition E demonstrate the utility of zinc oxide in inhibiting color shift in organomercaptosilane-containing poly(arylene sulfide) compositions.

Composition E represents a material suitable for the encapsulation of electronic components. It can be used, for example, to encapsulate capacitors. Composition E is also a laser printable material.

We claim:

1. A composition for encapsulating an active electronic component comprising:
   (i) about 25 to about 45 weight percent poly(arylene sulfide),
   (ii) about 0.1 to about 10 weight percent zinc oxide,
   (iii) about 5 to about 30 weight percent reinforcement, and
   (iv) about 40 to about 60 weight percent filler; wherein said weight percentages are based upon the total weight of (i), (ii), (iii) and (iv); and wherein the viscosity of said composition does not exceed about 800 poise as tested on a capillary rheometer at 650° F. and at a shear rate of 1000 (sec)$^{-1}$.

2. A composition in accordance with claim 1 wherein said filler is silica; and wherein said reinforcement is glass fibers or calcium silicate fibers.

3. A composition in accordance with claim 2 wherein (i) is poly(phenylene sulfide).

4. A composition in accordance with claim 3 wherein said composition further comprises 3-mercaptopropyltrimethoxysilane and a hydrogenated conjugated diene/monovinyl-substituted aromatic copolymer.

5. A composition in accordance with claim 1 wherein said viscosity of said composition does no exceed about 150 poise.

6. A composition according to claim 1 further comprising an organosilane.

7. A composition according to claim 1 further comprising a monoazo nickel complex pigment and an organomercaptosilane.

8. A composition for encapsulating passive electronic components comprising:
   (i) about 25 to about 45 weight percent poly(arylene sulfide),
   (ii) about 0.1 to about 10 weight percent zinc oxide,
   (iii) about 20 to about 50 weight percent reinforcement, and '(iv) about 18 to about 38 weight percent filler; wherein said weight percentages are based upon the total weight of (i), (ii), (iii) and (iv); and wherein the viscosity of said composition does not exceed about 1200 poise as tested on a capillary rheometer at 650° F. and at a shear rate of 1000 $(sec)^{-1}$.

9. A composition in accordance with claim 8 wherein said filler is selected from talc and calcium sulfate.

10. A composition in accordance with claim 9 wherein said reinforcement is selected from glass fibers and calcium silicate fibers.

11. A composition in accordance with claim 10 wherein (i) is poly(phenylene sulfide).

12. A composition in accordance with claim 8 wherein said filler is talc.

13. A composition in accordance with claim 9 wherein said filler is calcium sulfate.

14. A composition in accordance with claim 8 further comprising an organosilane.

15. A composition according to claim 8 further comprising a monoazo nickel complex pigment and an organomercaptosilane.

16. A composition comprising
    (a) poly(arylene sulfide),
    (b) zinc oxide,
    (c) pigment selected from monoazo nickel complex pigment, iron oxide pigment, lead chromate pigment, cadmium sulfo-sulfide pigment, and combinations thereof, and,
    (d) silane selected from organomercaptosilane, organoaminosilane, and combinations thereof.

17. A composition according to claim 16 wherein the weight ratio of (a) to (b) is at least about 2.5 to 1 and less than about 2,500 to 1; wherein the weight ratio of (a) to (c) is at least about 2.5 to 1 and less than about 2,500 to 1; and wherein the weight ratio of (a) to (d) is at least about 2.5 to 1 and less than about 2,500 to 1.

18. A composition according to claim 16 wherein the weight ratio of (a) to (b) is at least about 10 to 1 and less than about 100 to 1; wherein the weight ratio of (a) to (c) is at least about 10 to 1 and less than about 100 to 1; and wherein the weight ratio of (a) to (d) is at least about 10 to 1 and less than about 100 to 1.

19. A composition according to claim 18 wherein (a) is poly(phenylene sulfide).

20. A composition according to claim 16 wherein the amount of zinc oxide is sufficient to inhibit a temperature caused color shift.

21. A composition according to claim 16 wherein (d) is 3-mercaptopropyltrimethoxysilane.

22. A composition according to claim 17 wherein (c) is organomercaptosilane.

23. A composition according to claim 17 wherein (d) is organoaminosilane.

24. A composition according to claim 17 wherein (c) is a monoazo nickel complex pigment.

25. A composition according to claim 17 wherein (c) is a combination of (i) iron oxide pigment and (ii) lead chromate pigment or cadmium sulfo-sulfide pigment.

26. A composition according to claim 19 further comprising calcium sulfate; wherein (c) is monoazo nickel complex pigment and (d) is N-{2-[3-(trimethoxysilyl)-propylamino]ethyl}-p-vinylbenzylammonium chloride.

27. A composition according to claim 19 further comprising talc; wherein (c) is a combination of iron oxide pigment and cadmium sulfo-sulfide pigment and (d) is 3-mercaptopropyltrimethoxysilane.

28. A process comprising subjecting the composition of claim 20 to a temperature sufficient to cause a color shift in a material not having zinc oxide but otherwise being identical to said composition.

29. A composition for encapsulating an active electronic component consisting essentially of:
    (i) about 25 to about 45 weight percent poly(arylane sulfide),
    (ii) about 0.1 to about 10 weight percent zinc oxide,
    (iii) about 5 to about 30 weight percent reinforcement, and
    (iv) about 40 to about 60 weight percent filler; wherein said weight percentages are based upon the total weight of (i), (ii), (iii) and (iv); and wherein the viscosity of said composition does not exceed about 800 poise as tested on a capillary rheometer at 650° F. and at a shear rate of 1000 $(sec)^{-1}$.

30. A composition for encapsulating passive electronic components consisting essentially of
    (i) about 25 to about 45 weight percent poly(arylene sulfide),
    (ii) about 0.1 to about 10 weight percent zinc oxide,
    (iii) about 20 to about 50 weight percent reinforcement, and
    (iv) about 18 to about 38 weight percent filler; wherein said weight percentages are based upon the total weight of (i), (ii), (iii) and (iv); and wherein the viscosity of said composition does not exceed about 1200 poise as tested on a capillary rheometer at 650° F. and at a shear rate of 1000 $(sec)^{-1}$.

31. A composition consisting essentially of:
    (a) poly(arylene sulfide),
    (b) zinc oxide,
    (c) pigment selected from monoazo nickel complex pigment, iron oxide pigment, lead chromate pigment, cadmium sulfo-sulfide pigment, and combinations thereof, and,
    (d) silane selected from organomercaptosilane, organoaminosilane, and combinations thereof; wherein the weight ratio of (a) to (b) is at least about 2.5 to 1 and less than about 2,500 to 1; wherein the weight ratio of (a) to (c) is at least about 2.5 to 1 and less than about 2,500 to 1; and wherein the weight ratio of (a) to (d) is at least about 2.5 to 1 and less than about 2,500 to 1.

* * * * *